United States Patent [19]

Oda et al.

[11] Patent Number: 4,862,854

[45] Date of Patent: Sep. 5, 1989

[54] CONTROL SYSTEMS FOR VEHICLE ENGINES

[75] Inventors: Kazuya Oda, Hiroshima; Toshihiro Matsuoka, Higashihiroshima; Toru Onaka; Mitsuru Nagaoka, both of Hiroshima, all of Japan

[73] Assignee: Mazda Motor Corporation, Hiroshima, Japan

[21] Appl. No.: 177,973

[22] Filed: Apr. 5, 1988

[30] Foreign Application Priority Data

Apr. 6, 1987 [JP] Japan ................................. 62/84063
Apr. 25, 1987 [JP] Japan ............................... 62/102552

[51] Int. Cl.⁴ .............................................. F02D 9/02
[52] U.S. Cl. ................................... 123/399; 123/395
[58] Field of Search ............... 123/399, 395, 396, 492, 123/400, 403

[56] References Cited

U.S. PATENT DOCUMENTS

| | | | |
|---|---|---|---|
| 4,508,078 | 4/1985 | Takeuchi et al. | 123/399 |
| 4,515,126 | 5/1985 | Kessler | 123/399 |
| 4,543,933 | 10/1985 | Kessler et al. | 123/399 |
| 4,691,676 | 9/1987 | Kikuchi | 123/399 |
| 4,691,677 | 9/1987 | Hotate et al. | 123/399 |
| 4,759,329 | 7/1988 | Nobuo et al. | 123/399 |

Primary Examiner—Raymond A. Nelli
Attorney, Agent, or Firm—Gerald J. Ferguson, Jr.

[57] ABSTRACT

A control system for a vehicle engine comprises a first detecting device for detecting a controlled variable on an accelerator, an engine ouput adjusting device, such as a throttle valve, a second detecting device for detecting a situation wherein a vehicle employing therein the vehicle engine is in a travelling condition of traffic jam, and a control device for controlling the engine output adjusting device to cause the vehicle engine to vary its engine output with a predetermined rate of variation in the engine output to the controlled variable on the accelerator when the situation wherein the vehicle is in the travelling condition of traffic jam is not detected by the second detecting device and with a diminished rate of variation in the engine output to the controlled variable on the accelerator when the situation wherein the vehicle is in the travelling condition of traffic jam is detected by said second detecting device so as to have the engine output adjusted in accordance with the controlled variable on the accelerator detected by the first detecting device.

11 Claims, 10 Drawing Sheets

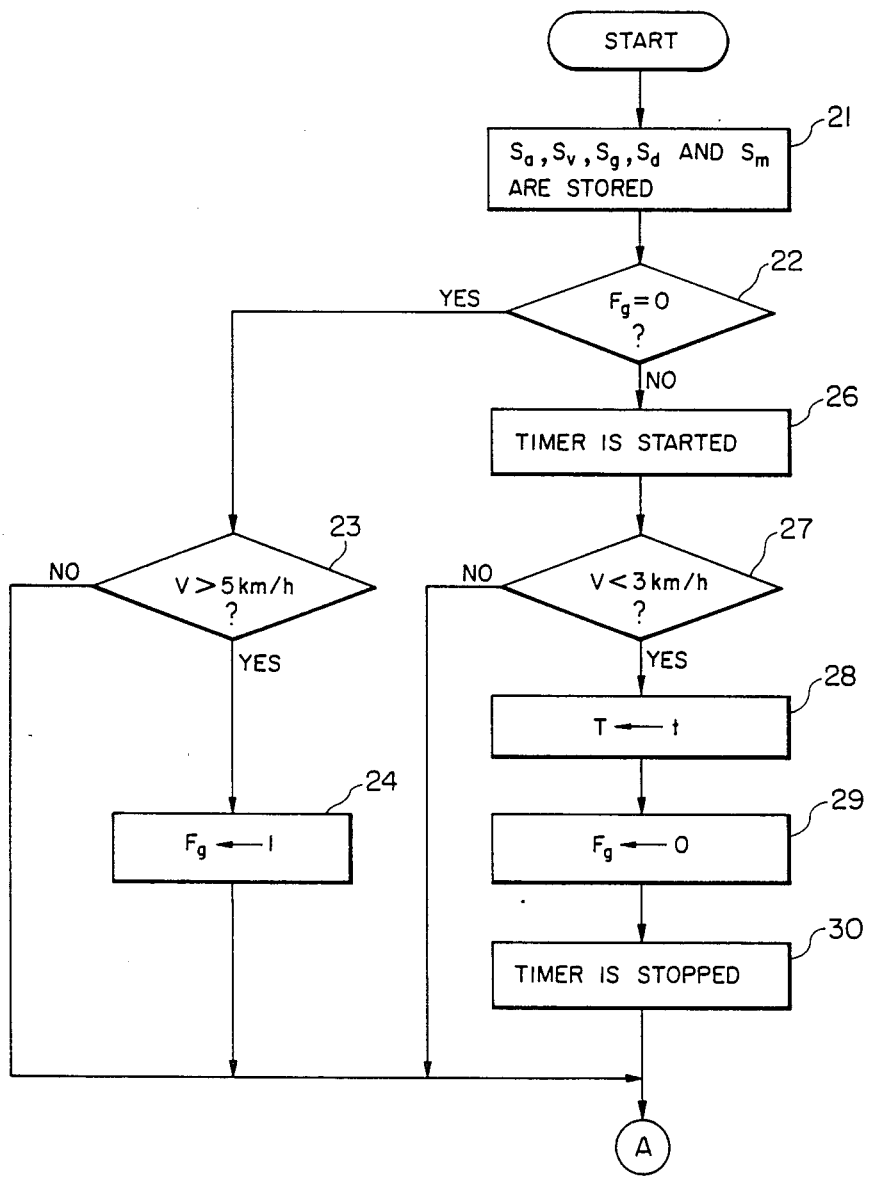
FIG. 2-a

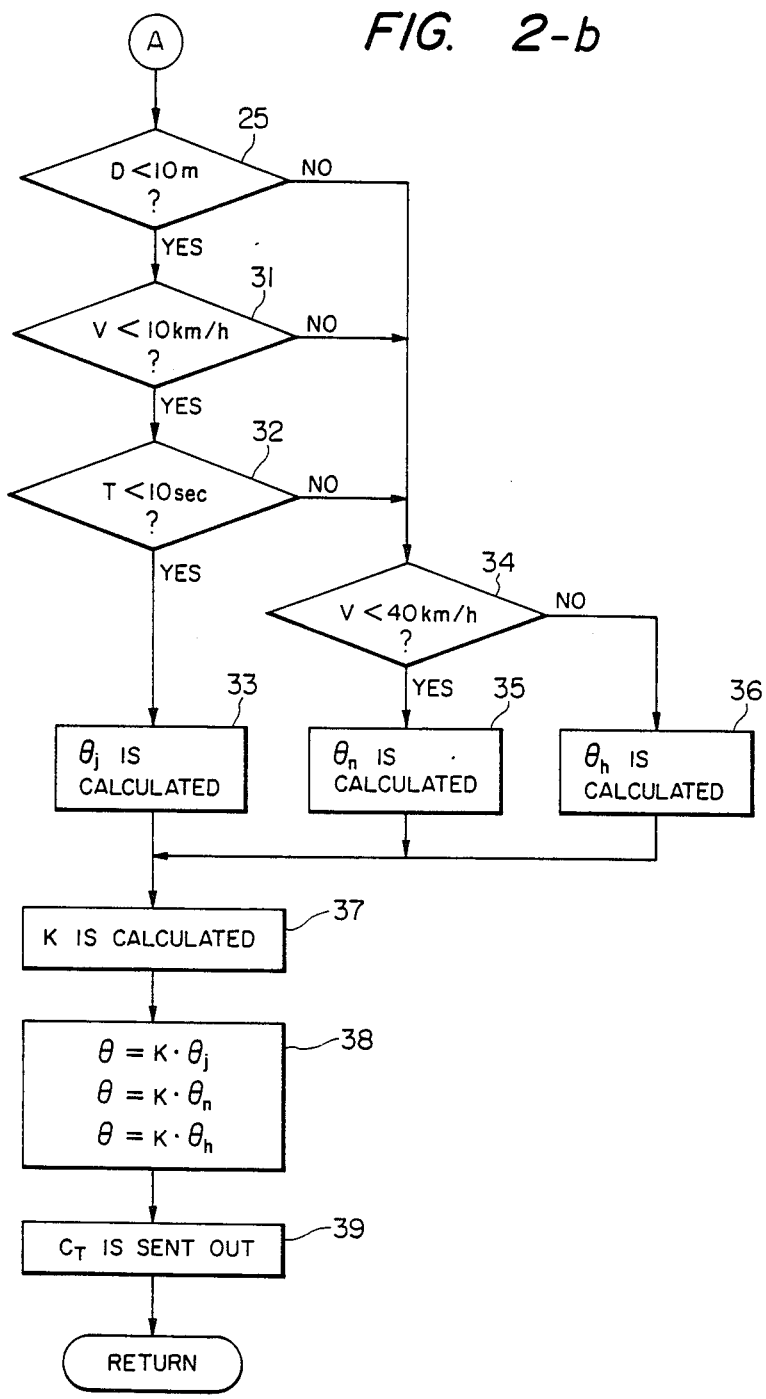
FIG. 2-b

FIG. 7-a
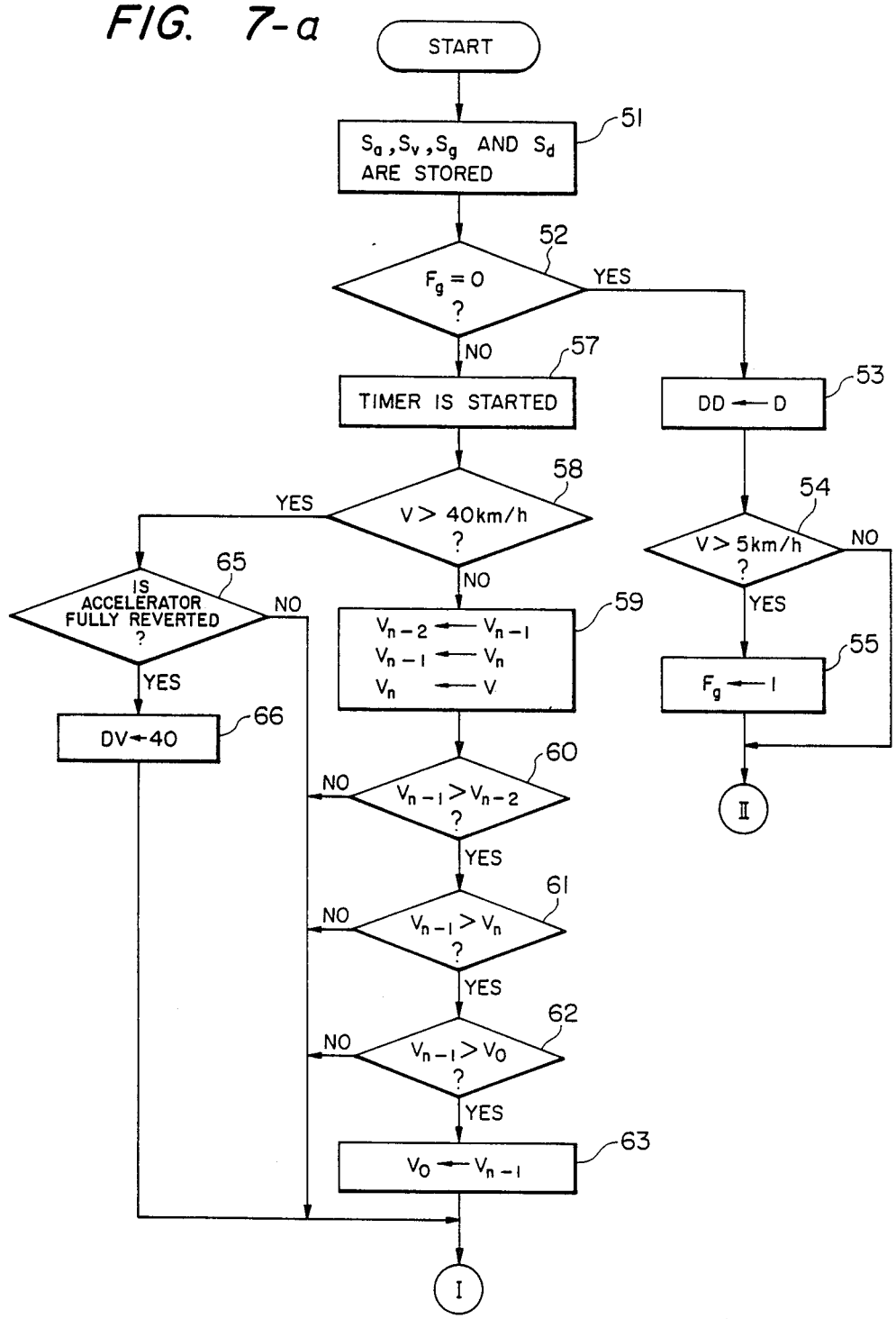

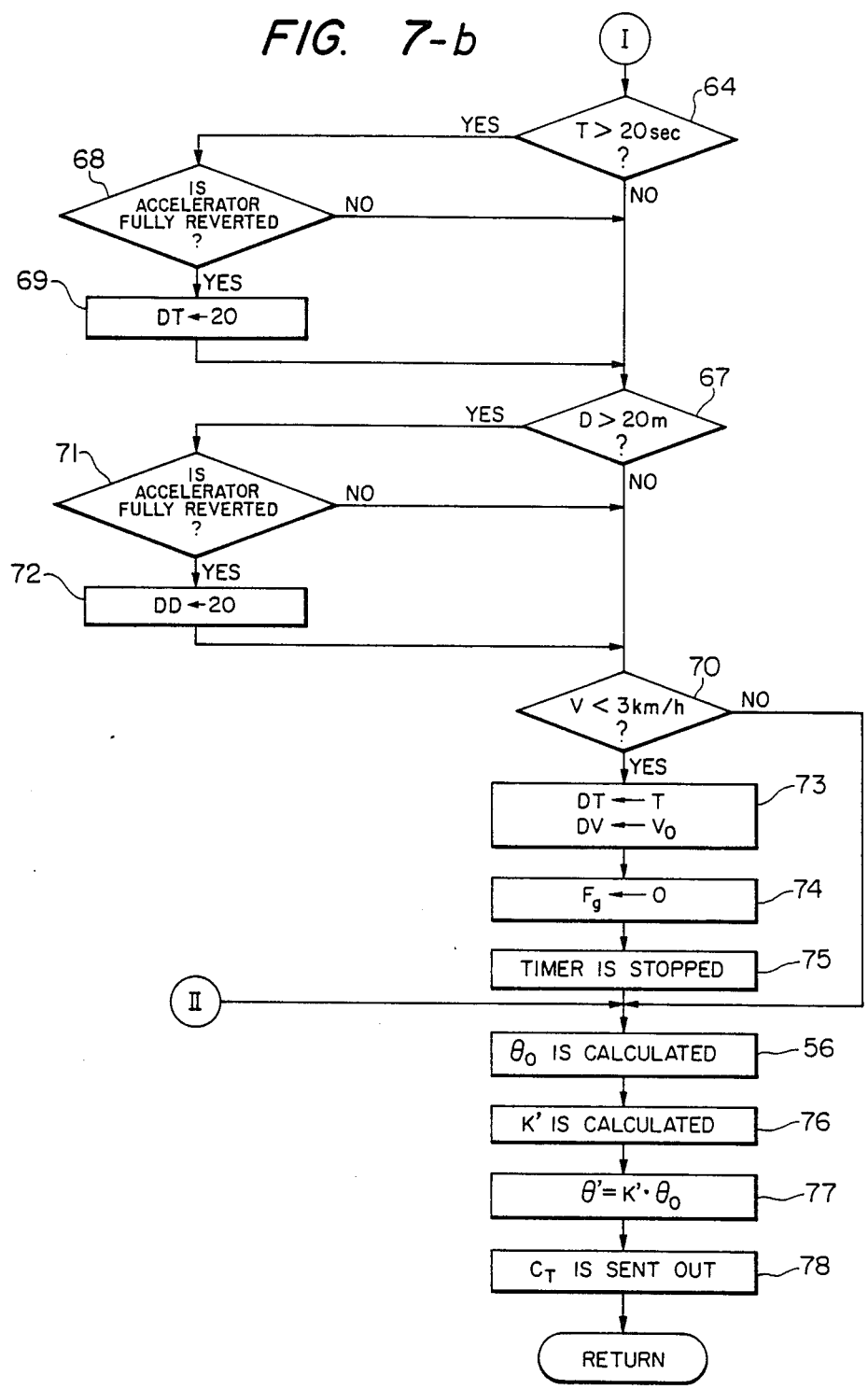
FIG. 7-b

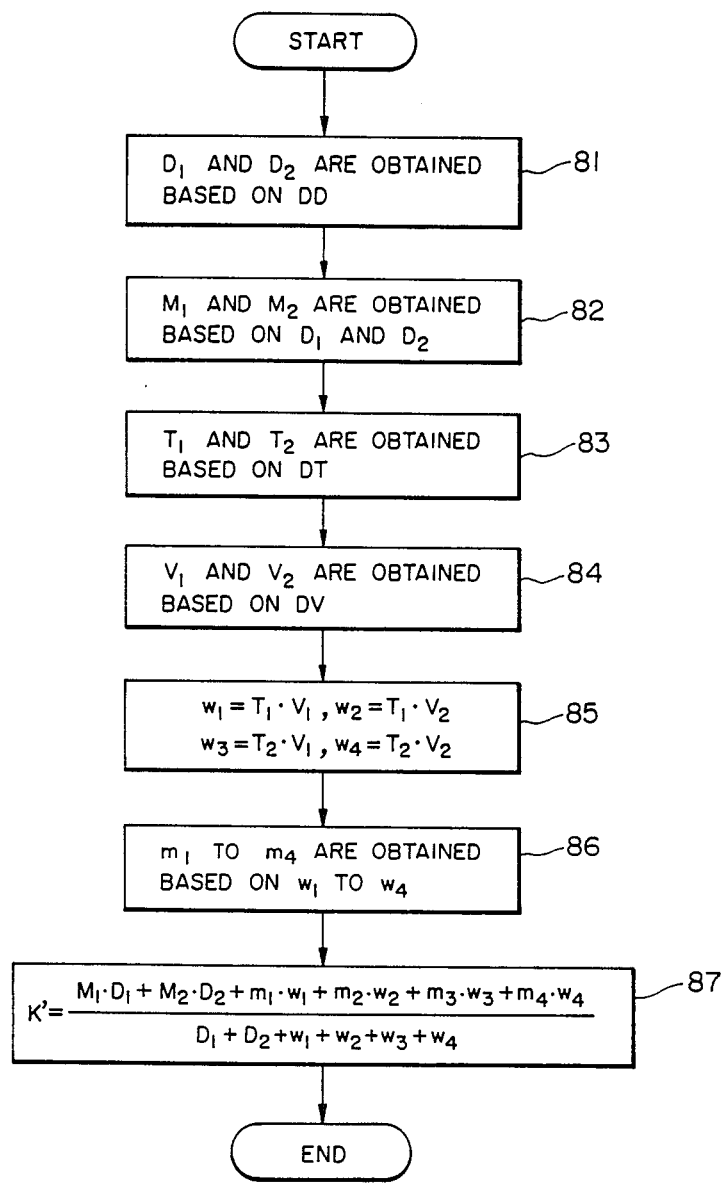

CONTROL SYSTEMS FOR VEHICLE ENGINES

BACKGROUND OF THE INVENTION

1. Field of the Invention

The present invention relates generally to control systems for vehicle engines, and more particularly, to a system for controlling an engine output adjusting device provided in a vehicle engine, such as a throttle valve, through an electric actuator provided for driving the engine output adjusting device in accordance with a controlled change in the position of an accelerator pedal accompanied with the vehicle engine.

2. Description of the Prior Art

It is well known, in a vehicle engine, to use a throttle valve which is controlled to vary its opening degree in accordance with a controlled change in the position of an accelerator pedal accompanied with the vehicle engine by way of a mechanical linkage provided between the accelerator and the throttle valve. A throttle valve control system for electrically controlling a throttle valve provided in a vehicle engine has also been proposed, as disclosed in, for example, the Japanese patent application published before examination under publication number 59/10750. In such a throttle valve control system, an accelerator position sensor, for detecting a controlled change in the position of an accelerator, and an electric actuator, for controlling electrically the throttle valve to have an opening degree corresponding to the controlled change detected by the accelerator position sensor, are provided. The opening degree of the throttle valve is controlled in accordance with a predetermined relation between the opening degree of the throttle valve and the controlled change in position of the accelerator. With the throttle valve control system thus proposed previously, it is possible to have a throttle valve operation that is optimal for a condition or state of travel of a vehicle employing the system, for example, by reducing a rate of variation in the opening degree of the throttle valve to the operated rate of change in the position of the accelerator when the vehicle is travelling on a rough road.

In the vehicle to which such a throttle valve control system, as described above, is applied, it is desired, for obtaining superior acceleration at the starting of the vehicle or in an accelerating condition wherein the vehicle is accelerated from an intermediate travelling speed, to increase the rate of variation in the opening degree of the throttle valve to the operated rate of change in position of the accelerator, so that the response of the acceleration of the vehicle engine is improved. However, in the case where the rate of variation in the opening degree of the throttle valve to the controlled rate of change in position of the accelerator is increased in a range of relatively small operated rate of change in position of the accelerator for the purpose of improving acceleration at the starting of the vehicle, the operability of the vehicle engine is deteriorated when the vehicle is travelling in a traffic jam condition. That is, if the rate of variation in the opening degree of the throttle valve to the operated rate of change in position of the accelerator is set to be relatively large when the vehicle is travelling in the traffic jam condition, then the travelling speed of the vehicle will be varied quickly in response to even a slight controlled change in the position of the accelerator. Therefore, it is necessary that the accelerator be subjected to a careful and delicate control by a driver of the vehicle. Such a careful and delicate control of the accelerator by the driver of the vehicle results in a problem whereby the driver of the vehicle becomes increasingly stressed and fatigued when the vehicle is travelling in a traffic jam condition.

OBJECTS AND SUMMARY OF THE INVENTION

Accordingly, it is an object of the present invention is to provide a control system for a vehicle engine which avoids the aforementioned disadvantages and problems encountered with the prior art.

Another object of the present invention is to provide a control system for a vehicle engine with which superior acceleration of a vehicle employing the control system is obtained at the starting of the vehicle in a normal travelling condition, and in addition, the operability of the vehicle engine is improved when the vehicle is travelling in a traffic jam condition.

A further object of the present invention is to provide a control system for a vehicle engine, wherein a rate of variation in an output of the vehicle engine to a controlled rate of change in position of an accelerator, accompanied with the vehicle engine, is set differently from each other in each of: a first situation wherein the vehicle is in a normal travelling condition, and a second situation wherein the vehicle is travelling in a traffic jam condition.

A still further object of the present invention is to provide a control system for a vehicle engine by which the vehicle engine is controlled to operate with a predetermined rate of variation in an output of the vehicle engine to a controlled rate of change in position of an accelerator, accompanied with the vehicle engine, when the vehicle is in a normal travelling condition, and with a diminished rate of variation in the output of the vehicle engine to the controlled rate of change in position of the accelerator when the vehicle is travelling in a traffic jam condition.

According to the present invention, there is provided a control system for a vehicle engine comprising: a first detecting device for detecting a controlled change in position of an accelerator accompanied with the vehicle engine, an engine output adjusting device for controlling the engine output of the vehicle engine, a second detecting device for detecting a situation when the vehicle in which the vehicle engine is employed is travelling in a traffic jam, and a control device for controlling the engine output adjusting device to cause the vehicle engine to vary the engine output with a predetermined rate of variation to the controlled rate of change in position of the accelerator when the traffic jam situation is not detected by the second detector, and with a diminished rate of variation in the engine output to the controlled rate of change in position of the accelerator when the traffic jam situation is detected by the second detector. Therefore, the engine output is adjusted in accordance with the controlled change in position of the accelerator detected by the first detector.

In an embodiment of control system for a vehicle engine according to the present invention, the control device is operative, on the occasion of controlling the engine output adjusting device, to use the diminished rate of variation, obtained separately from the predetermined rate of variation, instead of the predetermined rate of variation when a traffic jam situation is detected by the second detector.

In another embodiment of control system for a vehicle engine according to the present invention, the control device is operative, on the occasion of controlling the engine output adjusting device, to change the predetermined rate of variation into the diminished rate of variation, and to determine a value of the diminished rate of variation in response to the degree of congestion of the traffic jam when the traffic jam situation is detected by the second detector.

With the control system for a vehicle engine thus constituted according to the present invention, the vehicle engine, when not travelling in a traffic jam condition but in a normal travelling condition, is controlled to vary the engine output thereof with the predetermined rate of variation to the controlled rate of change in position of the accelerator, which is set to be a relatively large value. Therefore, the vehicle is accelerated favorably at the starting of the vehicle when the controlled change in position of the accelerator is increased. On the other hand, when the vehicle is in the traffic jam condition, the vehicle engine is controlled to vary the engine output thereof with a diminished rate of variation to the controlled rate of change in position of the accelerator, which is set to be a relatively small value. Therefore, it is not necessary for the operator to control the accelerator carefully and delicately in order for the vehicle to travel smoothly, so that the operability of the vehicle engine is improved. The result is that a driver of the vehicle is effectively relieved of his stress and fatigue when the vehicle is in a traffic jam situation.

The above, and other objects, features and advantages of the present invention will become apparent from the following detailed description which is to be read in conjunction with the accompanying drawings.

BRIEF DESCRIPTION OF THE DRAWINGS

FIGS. 2A and 2B are a flow chart showing an example of an operation program for a throttle valve control performed by a microcomputer which is used in a controller employed in the embodiment shown in FIG. 1;

FIGS. 7A, 7B and 9 are flow charts showing another example of the operation program for the throttle valve control performed by the microcomputer which is used in the controller employed in the embodiment shown in FIG. 1.

DESCRIPTION OF THE PREFERRED EMBODIMENT

The invention will now be described by way of example with reference to the accompanying drawings.

Figure 1:
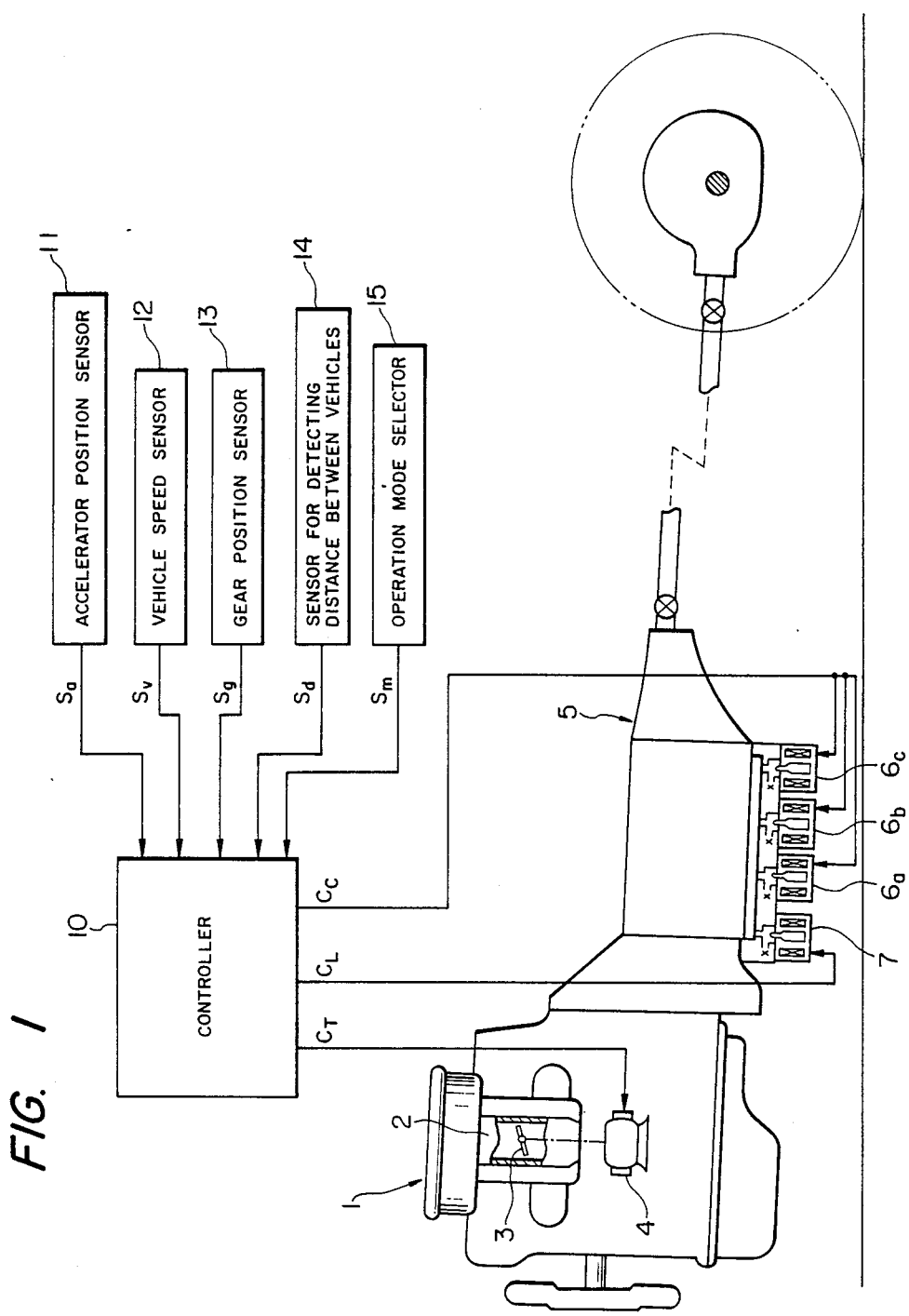
FIG. 1 is a schematic illustration showing one embodiment of control system for a vehicle engine according to the present invention, together with a vehicle engine accompanied with a transmission to which the embodiment is applied.

Referring to FIG. 1, an embodiment of a control system for a vehicle engine is illustrated according to the present invention, which is operative to perform both a throttle valve control and a speed change control. The control system is applied to an engine 1 with an automatic transmission 5, which are mounted on a vehicle, for controlling a throttle valve 3 provided on the engine 1 and a speed changing operation conducted in the automatic transmission 5. The engine 1 is provided with an inlet passage 2 in which the throttle valve 3 is disposed to be movable for adjusting air mass flow passing through the inlet passage 2. The throttle valve 3 is driven to vary its opening degree by an electric actuator 4 such as a direct current (DC) motor mounted on the engine 1.

The automatic transmission 5 is provided with three solenoid valves $6a$, $6b$ and $6c$ for speed change operation and an additional solenoid value 7 for lock-up operation. The solenoid valves $6a$, $6b$ and $6c$ are actuated selectively for switching an oil hydraulic control circuit contained in the automatic transmission 5 so as to cause a multi-stage power transmitting gear arrangement, contained in the automatic transmission 5, to select one of a plurality of speeds. The solenoid valve 7 is actuated as occasion demands for causing a lock-up clutch in a torque converter contained in the automatic transmission 5 to operate.

The electric actuator 4, the solenoid valves $6a$, $6b$ and $6c$, and the solenoid valve 7 are supplied with driving signals $C_T$, $C_C$ and $C_L$, respectively, from a controller 10 which comprises a microcomputer. The controller 10 is supplied with a detection output signal Sa obtained from an accelerator position sensor 11 for detecting the degree of change of the accelerator position from a set reference point, being the fully reverted position. The controller 10 is also supplied with a detection output signal Sv obtained from a vehicle speed sensor 12 for detecting a travelling speed V of the vehicle and a detection output signal Sg obtained from a gear position sensor 13 for detecting a gear position G in the multistage power transmitting gear arrangement contained in the automatic transmission 5. The gear position sensor 13 determines, for example, one of the first to fourth speeds in the automatic transmission 5. A detection output signal Sd obtained from a sensor 14 for detecting a distance D between vehicles by means of, for example, a laser light beam, and a mode signal Sm obtained from an operation mode selector 15 are further supplied to the controller 10. The operation mode selector 15 is operative to select one of the driving modes including an economical driving mode for driving the vehicle with economized fuel consumption, a powerful driving mode for driving the vehicle with an engine output of high power, and other driving modes set in stages between the economical driving mode and the powerful driving mode. The operation mode selector 15 likewise produces the mode signal Sm corresponding to a selected driving mode which is represented by a mode variable M.

The controller 10 is operative to conduct a traffic jam detection by detecting a situation wherein the vehicle is travelling in a traffic jam condition on the strength of the travelling speed V of the vehicle, represented by the detection output signal Sv, and the distance D between the vehicle and another vehicle, represented by the detection output signal Sd. The controller 10 then produces the driving signal $C_T$ based on a result of the following variables: (1) the traffic jam detection, (2) the controlled change in position $\alpha$ on the accelerator represented by the detection output signal Sa, (3) a rate $\alpha'$ of change of the controlled change in position $\alpha$ on the accelerator, (4) the travelling speed V of the vehicle, and (5) the mode variable M represented by the mode signal Sm. The signal $C_T$ is then supplied to the electric actuator 4, so as to perform the throttle valve control of the opening degree of the throttle valve 3. The throttle valve 3 is controlled to vary its opening degree with a predetermined rate of variation of the opening degree to the controlled change in the position of the accelerator when the vehicle is in a normal travelling condition, and with a diminished rate of variation of the opening degree to the controlled change in position of the accelerator when the vehicle is travelling in a sensed traffic jam condition. As a result of such throttle valve control, the engine 1 is controlled to vary the engine output (i.e., torque and/or rotational velocity) with a predetermined rate of variation of the engine output to the controlled change in position of the accelerator when the vehicle is in the normal travelling condition, and with a diminished rate of variation in the engine output to the controlled change in position of the accelerator when the vehicle is travelling in a traffic jam condition.

Further, the controller 10 is operative to produce the driving signals $C_C$ and $C_L$ based on the result of (1) the traffic jam detection, (2) the controlled change in position $\alpha$ of the accelerator, (3) the travelling speed V represented by the sensed signal $S_v$, (4) the gear position G represented by the detection output signal Sg, and (5) the mode variable M. The driving signals $C_C$ and $C_L$ are supplied to the solenoid valves 6a, 6b and 6c and the solenoid valve 7, respectively, so as to perform the speed change control, whereby the speed change operation and the lock-up operation are carried out in a different manner depending on the situation determined by the controller 10, such as wherein the vehicle is in the normal travelling condition and the situation wherein the vehicle is in a traffic jam condition.

One example of an operation program of the microcomputer constituting the controller 10 for controlling the opening degree of the throttle valve 3 in such a manner as discussed above is carried out in accordance with a flow chart shown in FIG. 2.

According to the flow chart shown in FIG. 2, first in process 21, the detection output signals Sa, Sv, Sg and Sd and the mode signal Sm are stored. Then, in decision step 22, it is checked whether a flag Fg, concerning the travelling speed V of the vehicle, is equal to 0 or not. If the flag Fg is equal to 0, then it is checked whether the travelling speed V of the vehicle, represented by the detection output signal Sv stored in the process step 21, is more than 5 km/h or not, in decision step 23. If the travelling speed V of the vehicle is equal to or less than 5 km/h, that is, the vehicle is at a stop or will come to a stop, the step advances to decision step 25 directly. To the contrary, when it is determined in the decision 23 that the travelling speed V of the vehicle is more than 5 km/h, that is, the vehicle is cruising, the flag Fg is changed to 1 from 0 in process step 24, and then the step advances to the decision step 25.

When it is determined in the decision step 22 that the flag Fg is not equal to 0, that is, the flag Fg is 1, a timer provided in the controller 10 is started to operate in process step 26 and it is then checked whether the travelling speed V of the vehicle, represented by the detection output signal Sv stored in the process step 21, is less than 3 km/h or not in decision step 27. If the travelling speed V of the vehicle is equal to or more than 3 km/h, that is, vehicle is travelling, the step advances to the decision step 25 directly. To the contrary, when it is determined in the decision step 27 that the travelling speed V of the vehicle is less than 3 km/h, that is, the vehicle is at a stop or will soon come to a stop, a time t measured by the timer provided in the controller 10 is stored as continuous travelling time T, in process step 28. After that, the flag Fg is changed to 0 from 1 in process step 29 and the timer is stopped in process step 30. Thereafter the step advances to the decision step 25.

Figure 3A:
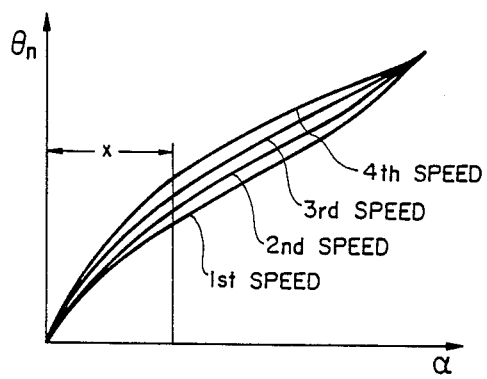
FIGS. 3A, 3B, 3C and 4 are graphic diagrams used for explaining the operation carried out in accordance with the flow chart shown in FIG. 2.

In the decision step 25, it is checked whether the distance D between the vehicle and another vehicle, represented by the detection output signal Sd stored in the process step 21, is less than 10 m or not. If the distance D between the vehicle and another vehicle is less than 10 m, then it is checked whether the travelling speed V of the vehicle is less than 10 km/h or not, in decision step 31. Then, if the travelling speed V of the vehicle is less than 10 km/h, it is further checked whether the continuous travelling time T, stored in the process step 28, is less than 10 seconds or not, in decision step 32. When it is determined in the decision step 32 that the continuous travelling time T is less than 10 seconds, it is then concluded that the vehicle is travelling in a traffic jam condition. Thereafter, a fundamental throttle opening degree $\theta j$ for the traffic jam condition is calculated in step 33 based on the controlled change in position $\alpha$ of the accelerator, represented by the detection output signal Sa stored in the process step 21. The throttle opening degree $\theta j$ is calculated in relationship to the controlled change in position $\alpha$ of the accelerator in accordance with one of the curves in FIG. 3C. The curve is selected in accordance with one of the first to fourth speeds determined by the gear position G represented by the detection output signal Sg stored in the process step 21, in process step 33. Then the step advances to process step 37. The fundamental throttle opening degree $\theta j$ for the traffic jam condition which satisfies the relationship to the controlled change in position $\alpha$ of the accelerator, shown with each of the curves in FIG. 3C, is set to be relatively small in a range x of relatively small controlled changes in position $\alpha$ of the accelerator, as understood from FIG. 3C.

On the other hand, in the case where it is determined in the decision step 25 that the distance D between the vehicle and another vehicle is equal to or more than 10 m, or in the case where it is determined in the decision step 31 that the travelling speed V of the vehicle is equal to or more than 10 km/h, or in the case where it is determined in the decision step 32 that the continuous travelling time T is equal to or more than 10 seconds, that is, the vehicle is not in the traffic jam condition in any of these cases, it is checked whether the travelling speed V of the vehicle is less than 40 km/h or not, in decision step 34. If it is determined in the decision step 34 that the travelling speed V of the vehicle is less than 40 km/h, that is, the vehicle is in a ordinary speed travelling condition, a fundamental throttle opening degree $O_n$ for the ordinary speed travelling condition is calculated. This throttle opening degree $\theta_n$ is calculated based on the controlled change in position $\alpha$ of the accelerator, represented by the detection output signal Sa stored in the process step 21, to satisfy such a relationship with the controlled change in position α of the accelerator in accordance with one of curves in FIG. 3A. Similarly as above in FIG. 3C, the curve is selected in accordance with one of the first to fourth speeds determined by the gear position G, which is represented by the detection output signal Sg stored in the process step 21, in process step 35. Thereafter the step advances to the process step 37. The fundamental throttle opening degree $\theta_n$ for the ordinary speed travelling condition which satisfies the relationship with the controlled change in position α of the accelerator in accordance with each of the curves in FIG. 3A is set to be larger than the fundamental throttle opening degree $O_j$ for the traffic jam condition in the range x of relatively small operated changes in position of the accelerator, as understood from FIG. 3A.

Figure 3B:
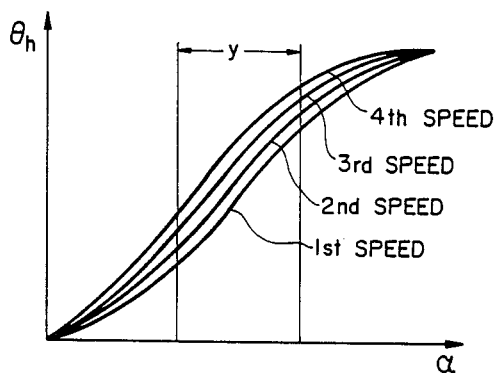
Figure 3C:
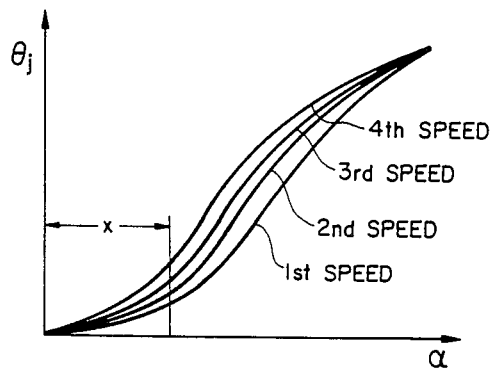

To the contrary, if it is determined in the decision step 34 that the travelling speed V of the vehicle is equal to or more than 40 km/h, that is, the vehicle is in a high speed travelling condition, then a fundamental throttle opening degree $O_h$ for the high speed travelling condition is calculated based on the controlled change in position α of the accelerator, represented by the detection output signal Sa stored in the process step 21, to satisfy such a relationship with the controlled change in position α of the accelerator in accordance with one of curves in FIG. 3B. The curve is likewise selected in accordance with one of the first to fourth speeds determined by the gear position G, which is represented by the detection output signal Sg stored in the process step 21, in process step 36. Thereafter the step advances to the process step 37. The fundamental throttle opening degree $\theta_h$ of the high speed travelling condition, which satisfies the relationship to the controlled change in position α of the accelerator in accordance with each of the curves in FIG. 3B, is set to be relatively large in a range y of middle controlled changes in position α of the accelerator, as understood from FIG. 3B.

Figure 4:
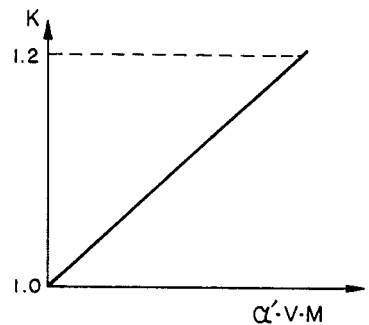

In the process step 37, a throttle factor K is calculated based on the rate α' of change of the controlled change in position α of the accelerator, the travelling speed V of the vehicle and the mode variable M represented by the mode signal Sm stored in the process step 21 by the following equation: K=α'.V.M. The throttle factor K thus obtained is set to have, for example, a value between 1.0 and 1.2 as shown in FIG. 4. Subsequently, in process step 38, a final throttle opening degree $\theta$ is calculated by multiplying the throttle factor K by the fundamental throttle opening degree $\theta_j$ when the vehicle is travelling in a traffic jam, or by the fundamental throttle opening degree $\theta_n$ when the vehicle is in the ordinary speed travelling condition, or by the fundamental throttle opening degree $\theta_h$ when the vehicle is in the high speed travelling condition.

Then, in process step 39, the driving signal $C_T$ is produced so as to represent the final throttle opening degree $\theta$ calculated in the process 38 and supplied to the electric actuator 4 so that the throttle valve 3 is controlled by the electric actuator 4 to have an actual opening degree corresponding to the final throttle opening degree $\theta$ calculated in the process step 38, and after that the step returns to the process step 21.

With the throttle valve control performed by the controller 10 as described above, the throttle valve 3 is controlled to vary its opening degree with a relatively large rate of variation compared to the controlled rate of change in position of the accelerator, so that the vehicle is accelerated favorably at the starting of the vehicle in which the controlled change in position of the accelerator is increased when the vehicle in in the normal travelling condition, and to vary the opening degree thereof with a diminished rate of variation compared to the controlled rate of change in position of the accelerator, so that the operability of the vehicle is effectively improved when the vehicle is travelling in the traffic jam condition.

Figure 5:
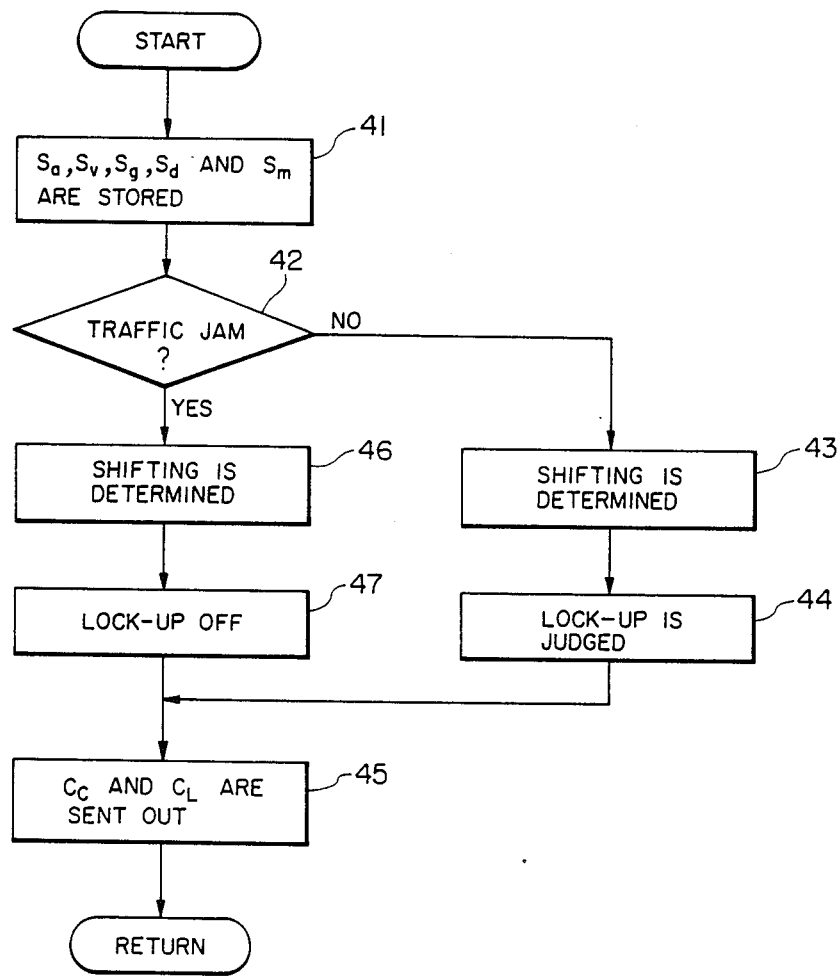
FIG. 5 is a flow chart showing an example of an operation program for a speed change control performed by the microcomputer which is used in the controller employed in the embodiment shown in FIG. 1.

An operation program of the microcomputer constituting the controller 10 for conducting the aforementioned speed change control is carried out in accordance with a flow chart shown in FIG. 5.

Figure 6:
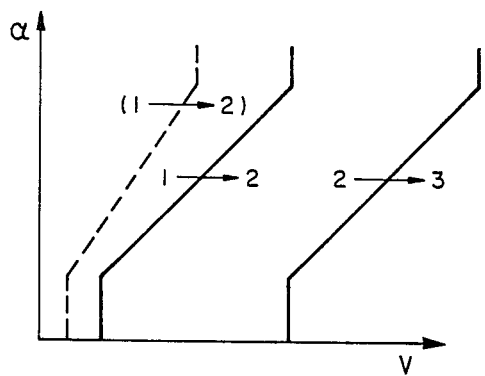
FIG. 6 is a graphic diagram used for explaining the operation carried out in accordance with the flow chart shown in FIG. 5.

According to the flow chart shown in FIG. 5, first in process step 41, the detection output signals Sa, Sv, Sg and Sd and the mode signal Sm are stored. Then, in decision step 42, it is checked whether the vehicle is in the traffic jam condition or not by checking steps similar to the decisions steps 25, 31 and 32 in the flow chart shown in FIG. 2. If it is determined in the decision step 42 that the vehicle is not in the traffic jam condition but in the normal travelling condition, the step advances to process step 43. In the process step 43, the controlled change in position α of the accelerator, represented by the detection output signal Sa stored in the process step 41, and the travelling speed V of the vehicle, represented by the detection output signal Sv stored in the process step 41, are plotted on a predetermined speed change characteristic map for the normal travelling condition. Such a map has, for example, 1-2, and 2-3 shifting lines, each shown by a solid line in FIG. 6. The shifting-up or shifting-down from the gear position G, represented by the detection output signal Sg stored in the process step 41, is determined based on a result of the position of the plotted point on the map. In this determination of the shifting of gear position, the 1-2 and 2-3 shifting lines are modified in response to the mode variable M represented by the mode signal Sm stored in the process step 41, as occasion demands.

Further, in process step 44, it is decided whether or not a lock-up state held by the lock-up clutch in the torque converter, contained in the automatic transmission 5, is to be released or not. Then in process step 45, the driving signal $C_C$, according to the determination of the shifting of gear position made in the process step 43, and the driving signal $C_L$, according to the decision concerning the lock-up state made in the process step 44, are produced. Next, the driving signal $C_C$ is supplied in common to the solenoid valves 6a, 6b and 6c for causing the multi-stage power transmitting gear arrangement, contained in the automatic transmission 5, to conduct the shifting-up or the shifting-down operation, and the driving signal $C_L$ is supplied to the solenoid valve 7 for causing the lock-up clutch in the torque converter to be engaged or disengaged. After that, the step returns to the process step 41.

On the other hand, if it is determined in the decision step 42 that the vehicle is in the traffic jam condition, then the step advances to process 46. In the process step 46, the controlled change in position α of the accelerator, represented by the detection output signal Sa stored in the process step 41, and the travelling speed V of the vehicle, represented by the detection output signal Sv stored in the process step 41, are plotted on a predetermined speed change characteristic map for the traffic jam condition. Such a map has, for example, 1-2 and 2-3 shifting lines shown respectively with broken and solid lines in FIG. 6. The shifting-up or shifting-down from the gear position G, represented by the detection output signal Sg stored in the process step 41, is determined based on a result of the plotted position on the map. In this determination of the shifting of gear position, the 1-2 and 2-3 shifting lines are also modified in response to the mode variable M represented by the mode signal Sm stored in the process step 41, as occasion demands.

Subsequently, in process step 47, it is decided that a lock-up state held by the lock-up clutch is to be released, and in process step 45, the driving signal $C_C$ corresponding to the determination of the shifting of gear position made in the process step 46 and the driving signal $C_L$ for releasing the lock-up clutch are produced. Next, the driving signal $C_C$ is supplied in common to the solenoid valves 6a, 6b and 6c for causing the multi-stage power transmitting gear arrangement, contained in the automatic transmission 5, to conduct the shifting-up or the shifting-down operation, and the driving signal $C_L$ is supplied to the solenoid valve 7 for causing the lock-up clutch in the torque converter to be disengaged. After that, the step returns to the process step 41.

Another example of the operation program of the microcomputer constituting the controller 10 for controlling the opening degree of the throttle valve 3 is carried out in accordance with a flow chart shown in FIG. 7.

According to the flow chart shown in FIG. 7, first, in process step 51, the detection output signals Sa, Sv, Sg and Sd are stored. Then, in decision step 52, it is checked whether a flag Fg concerning the travelling speed V of the vehicle is equal to 0 or not. If the flag Fg is 0, then the distance D between the vehicle and another vehicle, represented by the detection output signal Sd stored in the process step 51, is stored as distance data DD in process step 53. It is also checked whether the travelling speed V of the vehicle, represented by the detection output signal Sv stored in the process step 51, is more than 5 km/h or not, in decision step 54. If the travelling speed V of the vehicle is equal to or less than 5 km/h, that is, the vehicle is at a stop or will soon come to a stop, then the step advances to process step 56 directly. To the contrary, when it is determined in the decision step 54 that the travelling speed V of the vehicle is more than 5 km/h, that is, the vehicle is cruising, the flag Fg is changed to 1 from 0 in process step 55, and then the step advances to the process step 56.

When it is determined in the decision step 52 that the flag Fg is not 0, that is, the flag Fg is 1, a timer provided in the controller 10 is started to operate in process step 57, and it is checked whether the travelling speed V of the vehicle, represented by the detection output signal Sv stored in the process step 51, is more than 40 km/h or not in decision step 58. If the travelling speed V of the vehicle is equal to or less than 40 km/h, that is, the vehicle is in an ordinary speed travelling condition, the step advances to process step 59. In the process step 59, the travelling speed V of the vehicle, represented by the detection output signal $S_v$ stored in the process step 51, is stored as a first travelling speed Vn. Also, the travelling speed V of the vehicle which was stored as the first travelling speed Vn in the process step 59 from the preceding execution of the program is newly stored as a second travelling speed Vn−1. Furthermore, the travelling speed V of the vehicle which was stored as the second travelling speed Vn−1 in the process step 59 from the preceding execution of the program is newly stored as a third travelling speed Vn−2. Then, in decision 60, it is checked whether the second travelling speed Vn−1 is more than the third travelling speed Vn−2 or not. As the result, if the second travelling speed Vn−1 is equal to or less than the third travelling speed Vn−2, then the step advances to decision step 64. If the second travelling speed Vn−1 is more than the third travelling speed Vn−2, then it is checked whether the second travelling speed Vn−1 is more that the first travelling speed Vn or not, in decision step 61. As the result, if the second travelling speed Vn−1 is equal to or less than the first travelling speed Vn, the step advances to decision step 64. If the second travelling speed Vn−1 is more than the first travelling speed Vn, then it is checked whether the second travelling speed Vn−1 is more that a maximum travelling speed Vo which may or may not have been previously stored in process step 63, in decision step 62. As the result, if the second travelling speed Vn−1 is equal to or less than the maximum travelling speed Vo, the step advances to the decision step 64, and if the second travelling speed Vn−1 is more than the maximum travelling speed Vo, then the second travelling speed Vn−1 is newly stored as the maximum travelling speed Vo in the process step 63. With the operation thus carried out through the process step 59 to the process step 63, the maximum travelling speed Vo is properly renewed to have the latest maximum value in the process step 63.

To the contrary, when it is clarified in the decision step 58 that the travelling speed V of the vehicle is more that 40 km/h, that is, the vehicle is in a high speed travelling condition, it is checked in decision step 65 whether the accelerator is fully reverted or not based on the controlled change in position of the accelerator, represented by the detection output signal Sa stored in the process step 51. If the accelerator is not fully reverted, then the step advances to the decision step 64. To the contrary, when it is determined in the decision step 65 that the accelerator is fully reverted, then speed data DV which is set in process 73, as explained later, is revised to be 40 km/h, in process step 66. Thereafter the step advances to the decision step 64.

In the decision step 64, it is checked whether the continuous travelling time T, which is obtained in the process 73 as explained later, is more than 20 seconds or not. As the result, when the continuous travelling time T is equal to or less than 20 seconds, the step advances to decision step 67. If the continuous travelling time T is more than 20 seconds, then it is checked whether or not the accelerator is fully reverted based on the controlled change in position α of the accelerator, in decision step 68. If the accelerator is not fully reverted, then the step advances to the decision step 67. Contrarily, if the accelerator is fully reverted, then time data DT which is set in the process 73 as explained later is revised to be 20 km/h, in process step 69. Thereafter the step advances to the decision step 67.

In the decision step 67, it is checked whether the distance D between the vehicle and another vehicle is more than 20 m or not. As the result, when the distance D between the vehicle and another vehicle is equal to or less than 20 m, the step advances to decision step 70. If the distance D between the vehicle and another vehicle is more than 20 m, then it is checked whether or not the accelerator is fully reverted based on the controlled change in position α of the accelerator, in decision the step 71. If the accelerator is not fully reverted, then the step advances to the decision 70. Contrarily, if the accelerator is fully reverted, then the distance data DD is revised to be 20 m, in processss step 72, and then the step advances to the decision step 70.

In the decision step 70, it is checked whether the travelling speed V of the vehicle is less than 3 km/h or not. If the travelling speed V of the vehicle is equal to or more than 3 km/h, that is, the vehicle is travelling, the step advances to the process 56 directly. To the contrary, when it is determined in the decision step 70 that the travelling speed V of the vehicle is less than 3 km/h, that is, the vehicle is at a stop or will soon come to a stop, the travelling time T measured by the timer provided in the controller 10 is stored in the process step 73 as the time data DT, and the maximum travelling speed Vo stored in the process 63 is further stored in the process step 73 as the speed data DV. After that, the flag Fg is changed to 0 from 1 in process step 74 and the timer is stopped in process step 75. Thereafter the step advances to the process step 56.

Figure 8:
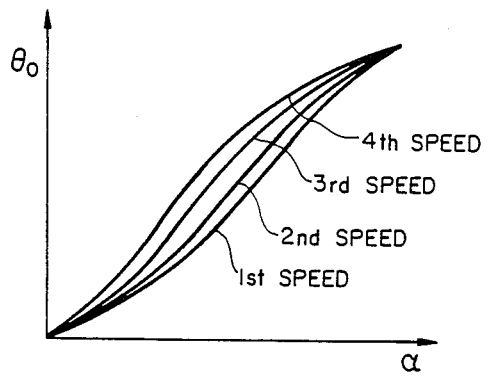
FIGS. 8, 10, 11, 12, 13 and 14 are graphic diagrams used for explaining the operation carried out in accordance with the flow charts shown in FIGS. 7 and 9.

In the process step 56, a fundamental throttle opening degree $\theta_0$ is calculated based on the controlled change in position $\alpha$ of the accelerator, represented by the detection output signal Sa stored in the process step 51, so as to satisfy a relationship to the controlled change in position $\alpha$ on the accelerator in accordance with one of curves in FIG. 8. The curve selected in accordance with one of the first to fourth speeds determined by the gear position G, which is represented by the detection output signal Sg stored in the process step 51. Then the step advances to process step 76. The fundamental throttle opening degree $\theta_0$ which satisfies the relationship with the controlled change in position $\alpha$ of the accelerator shown with each of the curves in FIG. 8 is set to increase with increment of the controlled change in position $\alpha$ of the accelerator, as understood from FIG. 8.

In the process step 76, a throttle factor K' is calculated based on the distance data DD, the time data DT and the speed data DV each obtained as described above. Then, in process step 77, a final throttle opening degree $\theta'$ is calculated by multiplying the fundamental throttle opening degree $\theta_0$ obtained in the process step 56 by the throttle factor K' obtained in the process step 76. Subsequently, in process step 78, the driving signal $C_T$ is produced so as to represent the final throttle opening degree $\theta'$ calculated in the process step 77 and is supplied to the electric actuator 4 so that the throttle valve 3 is controlled by the electric actuator 4 to have an actual opening degree corresponding to the final throttle opening degree $\theta'$ calculated in the process step 77. Thereafter the step returns to the process 51.

The calculation of the throttle factor K' in the process step 76 is carried out in the concrete in accordance with the theory of fuzzy control. One example of an operation program of the microcomputer constituting the controller 10 for performing the fuzzy control to calculate the throttle factor K' is carried out in accordance with a flow chart shown in FIG. 9.

Figure 10:
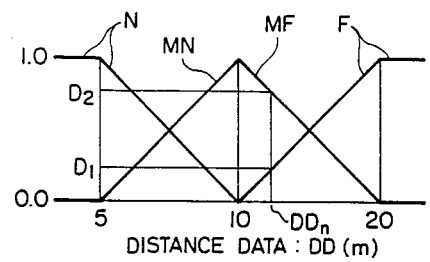

According to the flow chart shown in FIG. 9, first, in process step 81, the distance data DD is applied to an abscissa of a first membership characteristic diagram for a distance between vehicles as shown in FIG. 10, so that membership function values $D_1$ and $D_2$ are obtained in accordance with characteristic lines N and MN or characteristic lines F and MF. Each of the membership function values $D_1$ and $D_2$ resides in the range from 0.0 to 1.0. In this operation, the membership function values $D_1$ and $D_2$ are obtained in accordance with characteristic lines N and MN respectively when the distance data DD represents a distance equal to or less than 10 m or in accordance with characteristic lines F and MF respectively when the distance data DD represents a distance more than 10 m. In case of an embodiment shown in FIG. 10, the distance data DD has a value DDn which is more than 10 m and therefore the membership function values $D_1$ and $D_2$ are obtained in accordance with characteristic lines F and MF respectively.

Figure 11:
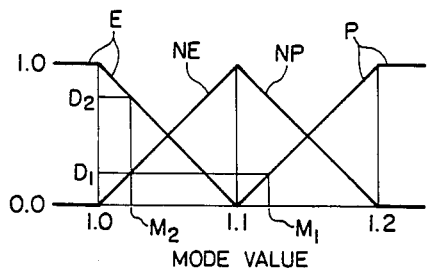

Next, in process step 82, the membership function values $D_1$ and $D_2$ obtained in the process step 81 are applied to an ordinate of a second membership characteristic diagram for a mode value as shown in FIG. 11, so that mode values $M_1$ and $M_2$ are obtained in accordance with characteristic lines E and NE or characteristic lines P and E. The characteristic line E is used instead of a characteristic line NP for obtaining the mode value $M_2$, and each of the mode values $M_1$ and $M_2$ resides in the range from 1.0 to 1.2. In this operation, the mode value $M_1$ is obtained in accordance with the characteristic line E when the membership function value $D_1$ is obtained in accordance with the characteristic line N or in accordance with the characteristic line P when the membership function value $D_1$ is obtained in accordance with the characteristic line F. The mode value $M_2$ is obtained in accordance with the characteristic line NE when the membership function value $D_2$ is obtained in accordance with the characteristic line MN or in accordance with the characteristic line E when the membership function value $D_2$ is obtained in accordance with the characteristic line MF. In the case of an embodiment shown in FIG. 11, the membership function values $D_1$ and $D_2$ are obtained in accordance with the characteristic lines F and MF, respectively, and therefore the mode values $M_1$ and $M_2$ are obtained in accordance with characteristic lines P and E, respectively.

Figure 12:
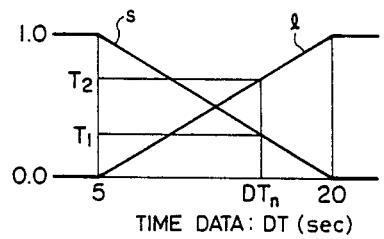

Then, in process step 83, the time data DT is applied to an abscissa of a third membership characteristic diagram for a travelling time as shown in FIG. 12, so that membership function values $T_1$ and $T_2$ are obtained in accordance with characteristic lines s and l, respectively. Each of the membership function values $T_1$ and $T_2$ resides in the range from 0.0 to 1.0. In the case of an embodiment shown in FIG. 12, the time data DT has a value DTn between 10 seconds and 20 seconds and therefore the membership function value $T_1$ is smaller than the membership function values $T_2$.

Figure 13:
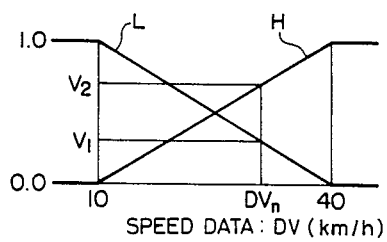

Further, in process step 84, the speed data DV is applied to an abscissa of a fourth membership characteristic diagram for a maximum travelling speed as shown in FIG. 13, so that membership function values $V_1$ and $V_2$ are obtained in accordance with characteristic lines L and H, respectively. Each of the membership function values $V_1$ and $V_2$ resides in the range from 0.0 to 1.0. In the case of an embodiment shown in FIG. 13, the speed data DV has a value DVn between 25 km/h and 40 km/h and therefore the membership function value $V_1$ is smaller than the membership function values $V_2$.

Figure 14:
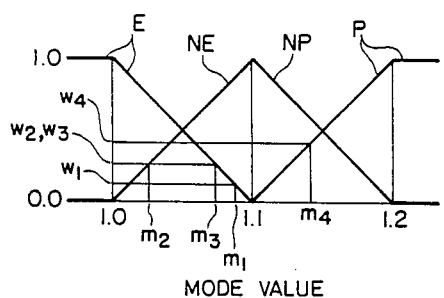

After the membership function data $T_1$, $T_2$, $V_1$ and $V_2$ are obtained as mentioned above, four multiplied values $w_1$, $w_2$, $w_3$ and $w_4$ are calculated in accordance with equations:

$$w_1 = T_1 \cdot V_1, \quad w_2 = T_1 \cdot V_2,$$

$$w_3 = T_2 \cdot V_1, \text{ and } w_4 = T_2 \cdot V_2,$$

in process step 85. Subsequently, in process 86, the multiplied values $w_1$, $w_2$, $w_3$ and $w_4$ are applied to an ordinate of a fifth membership characteristic diagram as shown in FIG. 14, so that a mode value $m_1$ is obtained in accordance with a characteristic line E, a mode value $m_2$ is obtained in accordance with a characteristic line NE, a mode value $m_3$ is obtained in accordance with a characteristic line E instead of a characteristic line NP, and a mode value $m_4$ is obtained in accordance with a characteristic line P. Each of the mode values $m_1$, $m_2$, $m_3$ and $m_4$ resides in the range from 1.0 to 1.2.

Then, in process step 87, the throttle factor $K'$ is calculated in accordance with the following equation:

$$K' = \frac{M_1 \cdot D_1 + M_2 \cdot D_2 + m_1 \cdot w_1 + m_2 \cdot w_2 + m_3 \cdot w_3 + m_4 \cdot w_4}{D_1 + D_2 + w_1 + w_2 + w_3 + w_4},$$

and after that the control operation is completed.

The membership function values $D_1$ and $D_2$ and the mode values $M_1$ and $M_2$ vary in response to the distance D between the vehicle and another vehicle represented by the detection output signal Sd, and the multiplied values $w_1$ to $w_4$ and the mode values $m_1$ to $m_4$ vary in response to a situation of advance of the vehicle. Consequently, the throttle factor $K'$ has a value varying to correspond to the degree of traffic jam in such a manner that the greater the degree of traffic jam is, the smaller the value of the throttle factor $K'$ becomes. Further, the throttle factor $K'$ has a maximum value: 1.2 when the vehicle is not in the traffic jam condition but in the normal travelling condition.

In the embodiment in which the throttle valve control is carried out in accordance with the flow charts shown in FIGS. 7 and 9, the throttle valve 3 is controlled by the electric actuator 4 to have its actual opening degree corresponding to the final opening degree $O'$ obtained by multiplying the controlled change in position $\alpha$ of the accelerator by the throttle factor $K'$, which is calculated based on the theory of fuzzy control as described above, to have a relatively small value in proportion to the degree of traffic jam. Therefore, the operability of the vehicle is greatly improved when the vehicle is travelling in the traffic jam condition.

During the throttle valve control carried out in accordance with the flow charts shown in FIGS. 7 and 9, the speed data DV is set to be 40 after the accelerator is fully reverted in the case where the travelling speed V of the vehicle exceeds 40 km/h; the time data DT is set to be 20 after the accelerator is fully reverted in the case where the continuous travelling time T exceeds 20 seconds; and the distance data DD is set to be 20 after the throttle valve 3 is fully reverted in the case where the distance D between the vehicle and another vehicle exceeds 20 m.

Further, in the calculation of the throttle factor $K'$, for the purpose of improving fuel consumption of the vehicle travelling in the traffic jam condition, the characteristic line E in the second membership characteristic diagram shown in FIG. 11 is used instead of the characteristic line NP in the second membership characteristic diagram for obtaining the mode value $M_2$. Also, the characteristic line E in the fifth membership characteristic diagram shown in FIG. 14 is used instead of the characteristic line NP in the fifth membership characteristic diagram for obtaining the mode value $w_3$.

What is claimed is:

1. A control system for a vehicle engine comprising:
first detecting means for detecting a controlled change of position of an accelerator from a reference position, said accelerator being operatively connected with the vehicle engine,
engine output adjusting means for controlling an engine output of the vehicle engine, said engine output including torque and/or rotational velocity of an output shaft of the engine,
second detecting means for detecting a condition wherein a vehicle in which the vehicle engine is employed is travelling in a traffic jam situation, and
controlling means for controlling said engine output adjusting means to cause the vehicle engine to vary the engine output with a predetermined rate of variation to a controlled rate of change of the position of said accelerator when the condition wherein the vehicle is travelling in the traffic jam situation is not detected by the second detecting means, and with a diminished rate of variation in the engine output to the controlled rate of change of the position of said accelerator when the condition wherein the vehicle is travelling in a traffic jam situation is detected by said second detecting means so that the engine output is adjusted in accordance with the controlled change in position of the accelerator detected by said first detecting means.

2. A control system according to claim 1, wherein said engine output adjusting means comprises a throttle valve disposed in an inlet passage of the vehicle engine for adjusting air mass flow passing through the inlet passage.

3. A control system according to claim 1, wherein said second detecting means comprises sensing means for detecting at least one of a distance between the vehicle and another vehicle, a travelling speed of the vehicle and a continuous travelling time of the vehicle, and means for the determination of the condition wherein the vehicle is travelling in the traffic jam situation based on a detection output of said sensing means.

4. A control system according to claim 1, wherein said controlling means is operative to provide separately said predetermined rate of variation and said diminished rate of variation in response to a detection output of said second detecting means and to control said engine output adjusting means with one of said predetermined rate of variation and said diminished rate of variation, wherein said diminished rate of variation is set to be smaller than said predetermined rate of variation in a range of relatively small values of the controlled change of position of said accelerator from the reference position.

5. A control system for a vehicle engine comprising:
first detecting means for detecting a controlled change of position of an accelerator from a reference position, said accelerator being operatively connected with the vehicle engine,
engine output adjusting means for controlling an engine output of the vehicle engine, said engine output including torque and/or rotational velocity of an output shaft,
second detecting means for detecting a condition wherein a vehicle in which the vehicle engine is employed is travelling in a traffic jam situation, and
controlling means for determining a first drive signal value for said engine output adjusting means based on a detection output of said first detecting means to actuate said engine output adjusting means in accordance with said first drive signal value when the condition wherein the vehicle is travelling in the traffic jam situation is not detected by the second detecting means, and for determining a second drive signal value for said engine output adjusting means which is smaller than said first drive signal value based on the detection output of said first detecting means to actuate said engine output adjusting means in accordance with said second drive signal value when the condition wherein the vehicle is travelling in the traffic jam situation is detected by the second detecting means, so as to cause the vehicle engine to have the engine output adjusted in accordance with the controlled change in position of said accelerator detected by said first detecting means.

6. A control system according to claim 5, wherein said engine output adjusting means comprises a throttle valve disposed in an inlet passage of the vehicle engine for adjusting air mass flow passing through the inlet passage.

7. A control system according to claim 5, wherein said second detecting means comprises sensing means for detecting at least one of a distance between the vehicle and another vehicle, a travelling speed of the vehicle and a continuous travelling time of the vehicle, and means for the determination of the condition wherein the vehicle is travelling in the traffic jam situation based on a detection output of said sensing means.

8. A control system according to claim 5, wherein said controlling means comprises means for determining a fundamental drive signal value on said engine output adjusting means based on the detection output of said first detecting means, means for producing a compensating factor having a value varying in response to a detection output of said second detecting means, means for revising said fundamental drive signal value with said compensating factor so as to obtain said first drive signal value when the condition wherein the vehicle is travelling in the traffic jam situation is not detected by the second detecting means, and to obtain said second drive signal value when the condition wherein the vehicle is travelling in the traffic jam situation is detected by the second detecting means, and means for actuating said engine output control means in accordance with one of said first and second drive signal values.

9. A control system according to claim 8, wherein said second detecting means comprises sensing means for detecting a distance between the vehicle and another vehicle, a travelling speed of the vehicle and a continuous travelling time of the vehicle, and means for the determination of the condition wherein the vehicle is travelling in the traffic jam situation based on the distance between the vehicle and another vehicle, the travelling speed of the vehicle and the continuous travelling time of the vehicle detected by said sensing means, and said means for producing the compensating factor comprises means for obtaining a first function value corresponding to the distance between the vehicle and another vehicle when the distance between the vehicle and another vehicle is less than a predetermined value, means for obtaining a second function value corresponding to the travelling speed of the vehicle when the travelling speed of the vehicle is less than a predetermined value, means for obtaining a third function value corresponding to the continuous travelling time of the vehicle when the continuous travelling time of the vehicle is less than a predetermined value, and means for calculating the compensating factor based on said first, second and third function values.

10. A control system according to claim 9, wherein said compensating factor has a maximum value when the condition wherein the vehicle is travelling in the traffic jam situation is not detected by said second detecting means.

11. A control system according to claim 1, wherein said controlling means is operative to effect a difference between said predetermined rate of variation and said diminished rate of variation in response to the detection output of said second detecting means in, at least, the range of relatively small values of the controlled change of position of said accelerator from the reference position.

* * * * *